United States Patent
Takatsuka et al.

(10) Patent No.: US 8,365,791 B2
(45) Date of Patent: Feb. 5, 2013

(54) METHOD AND APPARATUS OF ADHERING BELT EDGE TAPE

(75) Inventors: Tomoyuki Takatsuka, Osaka (JP); Taizo Yamamoto, Osaka (JP); Makoto Koumo, Osaka (JP); Yu Hatayama, Osaka (JP)

(73) Assignee: Toyo Tire & Rubber Co., LTd., Osaka-shi (JP)

( * ) Notice: Subject to any disclaimer, the term of this patent is extended or adjusted under 35 U.S.C. 154(b) by 0 days.

(21) Appl. No.: 13/210,944

(22) Filed: Aug. 16, 2011

(65) Prior Publication Data

US 2011/0297324 A1    Dec. 8, 2011

Related U.S. Application Data

(62) Division of application No. 12/279,474, filed as application No. PCT/JP2006/302605 on Feb. 15, 2006.

(51) Int. Cl.
   *B29D 30/16*   (2006.01)
(52) U.S. Cl. ........ 156/397; 156/130; 156/133; 156/117; 152/532
(58) Field of Classification Search .......... 156/130, 156/133, 117, 397, 527, 531, 394.1, 446, 156/532, 466; 152/532; *B29D 30/16, 30/70, B29D 30/14*
See application file for complete search history.

(56) References Cited

U.S. PATENT DOCUMENTS

| | | | |
|---|---|---|---|
| 4,983,243 A * | 1/1991 | Nakano et al. | 156/192 |
| 4,990,203 A * | 2/1991 | Okada et al. | 156/117 |
| 5,312,502 A * | 5/1994 | Imai et al. | 156/130.3 |
| 6,955,734 B2 * | 10/2005 | Ogawa | 156/117 |
| 7,947,140 B2 * | 5/2011 | Uchida et al. | 156/117 |

FOREIGN PATENT DOCUMENTS

| | | |
|---|---|---|
| JP | 02-072939 A | 3/1990 |
| JP | 11-99564 A | 4/1999 |
| JP | 2000-280373 A | 10/2000 |
| JP | 2002-144815 A | 5/2002 |
| JP | 2003-220806 A | 8/2003 |
| JP | 2004 098480 | * 4/2004 |
| JP | 2004-098480 A | 4/2004 |
| JP | 2004-189156 A | 7/2004 |

* cited by examiner

*Primary Examiner* — Khanh P Nguyen
*Assistant Examiner* — Vishal I Patel
(74) *Attorney, Agent, or Firm* — Westerman, Hattori, Daniels & Adrian, LLP

(57) ABSTRACT

According to the present invention, in adhering a belt edge tape (1) which is interposed between belt layers of a tire, press rollers surely adhere by pressing the belt edge tape (1) to a building drum (D) while preventing the press rollers from being caught by end portions of inclined cords which constitute a belt. For this end, in adhering the belt edge tape (1) to both respective side edge portions of the belt on the outer peripheral surface of the building drum by supplying the belt edge tape (1) toward the outer peripheral surface of the building drum by pressing using an extruder (10) which constitutes a supply device facing the building drum (D) in an opposed manner and by pressing the belt edge tape (1) to the building drum (D) using a press roller (15*a*), (15*b*) on a leading side as viewed from a position where the belt edge tape (1) is supplied in the rotational direction of the building drum (D), the building drum (D) is rotated in the direction that end portions of the reinforcing cords on the side edge portion of the belt which constitutes a tape adhering side are positioned on a trailing side in the rotational direction of the building drum (D) thus adhering the belt edge tape (1) to the side edge portion.

5 Claims, 9 Drawing Sheets

METHOD AND APPARATUS OF ADHERING BELT EDGE TAPE

CROSS-REFERENCE TO RELATED APPLICATIONS

This application is a Divisional application of U.S. application Ser. No. 12/279,474, filed on Aug. 14, 2008, and wherein application Ser. No. 12/279,474 is a national stage application filed under 35 USC §371 of International Application No. PCT/JP2006/302605, filed Feb. 15, 2006, the contents of which are incorporated herein by reference in their entirety.

TECHNICAL FIELD

The present invention relates to a method and an apparatus of adhering belt edge tapes in tire building.

BACKGROUND ART

In general, the tire (mainly vehicle-use tire) T is constituted of a plurality of rubber members and a plurality of reinforcing members, wherein the reinforcing members are mainly formed of cords. As a typical example, as shown in FIG. 10, the tire T is formed by combining the rubber members such as an inner liner 2, a tread 3, side walls 4, rim strips or chafers 5 with a carcass layer 6 and a belt layer 7 constituting a reinforcing member including cords, a bead body 8 consisting of bead cores 8a and bead fillers 8b. FIG. 9 shows one example of respective constitutional members of the tire in an exploded manner.

The belt layer 7 is formed of a belt member in which a large number of reinforcing cords mainly made of metal is embedded in a rubber material in parallel to each other. The cords are arranged in an inclination direction at a predetermined angle with respect to the circumferential direction of the tire. Usually, the belt layer 7 is formed of a plural layers of belts 7a, 7b having different widths which are stacked with the respective inclination directions arranged opposite to each other. In general, the belt 7a which constitutes a lower layer (a first layer) has a width larger than a width of the belt 7b which constitutes an upper layer (a second layer). Although not shown in FIG. 10, a reinforcing layer 9 formed by a spirally-wound ribbon containing synthetic resin cords therein is formed on the belt layer 7.

For the purpose of protecting side edge portions of both belts 7a, 7b and for preventing the occurrence of a defect such as separation, so-called belt edge tapes 1 made of a rubber member which play a role of cushion rubber are interposed between both side end portions of the belts 7a, 7b. Further, when necessary, at a position inwardly from both side end portions of the belts 7a, 7b, an inter-belt pad (omitted from the drawing) which constitutes a buffer member for shearing strain generated between belts is interposed between both belts 7a, 7b.

Conventionally, in a step different from a tire building step, the belt is manufactured and the belt edge tapes 1 are adhered to the manufactured belt. Recently, there has been proposed adhesion building in which a belt is manufactured at a position where the belt faces a building drum in an opposed manner in the adhesion step during tire building and the manufactured belt is supplied to the building drum to the building drum while the belt is being manufactured. Along with such adhesion building, the belt edge tapes 1 and the inter-belt pad are also adhered in a step after the belt 7a which constitutes the lower layer is adhered. The belt edge tapes 1 also functions as the inter-belt pad.

In adhering the belt edge tape 1, mainly, an unvulcanized rubber member is extruded in a tape shape having a predetermined width and a predetermined thickness by an extruder along with the rotation of the building drum, and extruded belt edge tape 1 is adhered to a side edge portion of the belt 7a by pressing the belt edge tape 1 using the press roller.

Here, in view of the configuration of a belt member, particularly in view of the configuration of the side edge portion where the inclined bonding ends and ends of the reinforcing cords in the inclination direction are present in manufacture, depending on the rotational direction of the building drum, the press rollers rub against the belt and hence, the press roller is caught by the bonding ends or the ends of the reinforcing cords whereby the belt edge tape made of the rubber material may be broken. Accordingly, there may be a case where the belt edge tape cannot be pressed smoothly.

That is, the belt member is manufactured as follows. A strip-shaped material having a predetermined width and containing reinforcing cords extending in the longitudinal direction is cut obliquely at a predetermined angle (usually approximately 20°) corresponding to a cord angle of the belt layer with a length corresponding to the belt width, and fine-strip-shaped belt member pieces acquired by cutting have sides thereof bonded to each other such that cut ends are aligned to form both side edges of the belt member thus producing belt members having a length amounting to one circumference of a tire or elongated belt member (see patent document 1 and patent document 2, for example).

Due to such a constitution, on the side edge portion of the belt member, as illustrated in FIG. 8, cut ends of the reinforcing cords C arranged in the inclination direction are exposed and, at the same time, inclined bonding ends of a large number of fine-strip-shaped belt member pieces b are also present. Further, an acute-angled distal end b1 is present due to the inclination of the fine-strip-shaped belt member piece b. Depending on a bonding state, the above-mentioned distal end b1 may be slightly warped or formed in a projecting manner.

Accordingly, in adhering the belt edge tape to the side edge portion of the belt, when the adhesion is performed by rotating the building drum always in the same direction, on either one side edge portion, the press roller adheres the belt edge tape by pushing the inclined ends of the reinforcing cords and the acute-angled distal ends of the inclined belt member pieces in the direction that the press roller rubs against such ends of the reinforcing cords and the distal ends. Eventually, the ends of the reinforcing cords or the distal ends are caught by the press roller and hence, the press roller cannot perform smooth pressing whereby the belt edge tape is broken or a pressing force becomes insufficient.

Patent document 1: JP-A-11-99564
Patent document 2: JP-A-2000-280373

DISCLOSURE OF THE INVENTION

Problems that the Invention is to Solve

The present invention has been made to overcome the above-mentioned drawbacks, and it is an object of the present invention to provide an adhesion method and an apparatus of the belt edge tape which can, in building a tire, facilitate the adhesion of a belt edge tape made of a rubber material interposed between side end portions of belt layers, and smoothly and surely adhere the belt edge tape by pressing using press rollers while preventing cords end or acute-angled distal ends of fine-stripe-shaped belt member pieces arranged in the inclination direction from being caught by the press rollers thus enhancing the adhering accuracy of the belt edge tape.

Means for Solving the Problems

The present invention is directed to a method of adhering belt edge tapes made of a rubber material which are interposed between a plurality of belts containing inclined reinforcing cords therein to side edge portions of a belt adhered to an outer peripheral surface of a building drum during one step of tire building, wherein in adhering the belt edge tape to both respective side edge portions of belt on the outer peripheral surface of the building drum by supplying the belt edge tape toward the outer peripheral surface of the building drum along with the rotation of the building drum by a supply device which faces the building drum in an opposed manner and by pressing the belt edge tape to the building drum using a press roller on a leading side as viewed from a position where the belt edge tape is supplied in the rotational direction of the building drum along with the supplying of the belt edge tape, the building drum is rotated in the direction that end portions of the reinforcing cords on the side edge portion of the belt which constitutes a tape adhering side are positioned on a trailing side in the rotational direction of the building drum thus adhering the belt edge tape to the side edge portion.

According to the above-mentioned method, in adhering the belt edge tape to both side edge portions of the belt, on either side of both side edge portions, the building drum is rotated in the direction that end portions of the reinforcing cords at the side edge portion are positioned on a trailing side in the rotational direction of the building drum. Accordingly, there is no possibility that the press roller rubs against the end portions of the inclined cords or the acute-angled distal ends of the inclined belt member pieces and hence, it is possible to surely and smoothly adhere the belt edge tape while pressing the belt edge tape in the inclination flowing direction.

As the supply device, an extruder which extrudes the belt edge tape having a predetermined cross-sectional shape toward the building drum may preferably be used. Due to such constitution, it is possible to smoothly adhere the belt edge tape made of an unvulcanized rubber material to the side edge portion of the belt while extruding the belt edge tape as described above. Particularly, by suitably setting a cross-sectional shape of the belt edge tape extruded from the extruder, the tape can be also used as inter-belt pads thus omitting conventional inter-belt pads.

In the method of adhering belt edge tapes, the belt may preferably be formed of a belt member which is obtained by obliquely cutting a belt-use strip-shaped material made of a rubber material in which a plurality of reinforcing cords is embedded in parallel to each other and by arranging and bonding a large number of fine-strip-shaped belt member pieces which are formed by cutting in a state that the cords are arranged in the inclination direction, in adhering the belt edge tape to both respective side edge portions of the belt adhered to the building drum, the building drum may preferably be rotated in the direction that end portions of the belt member pieces at the side edge portion of the belt which constitutes a tape adhering side are positioned on a trailing side in the rotational direction of the building drum.

Due to such constitution, in the manufacture of the belt, also on the side edge portion of the belt where the fine-strip-shaped belt member pieces obtained by obliquely cutting the elongated strip-shaped material are arranged and bonded to each other, there is no possibility that the press rollers rub against acute-angled distal ends formed by oblique cutting and hence, the belt edge tape can be adhered without making the press rollers caught by the acute-angled distal ends at the time of pressing the belt edge tape using the press rollers.

Further, the present invention is directed to an apparatus of adhering belt edge tapes made of a rubber material which are interposed between a plurality of layers of belts containing inclined reinforcing cords therein to both side edge portions of a belt adhered to an outer peripheral surface of a building drum during of the belt tire building, wherein the apparatus includes a supply device which faces the building drum capable of being rotated in the forward and reverse directions in an opposed manner and supplies the belt edge tape toward the outer peripheral surface of the building drum along with the rotation of the building drum, a pair of upper and lower press rollers capable of performing a pressing operation respectively is mounted on upper and lower portions of the supply device such that the press rollers are allowed to press the belt edge tape to the outer peripheral surface of the building drum, the upper and lower press rollers are arranged such that the press rollers press the belt edge tape on a leading side in the rotational direction of the building drum along with the forward or reverse rotation of the building drum.

Due to such constitution, with respect to one side edge portion of the belt and another side edge portion of the belt which constitute the lower layers adhered to the outer peripheral surface of the building drum, by setting the rotational directions of the building drum opposite to each other, on either one of the side edge portions, the building drum is rotated in the direction that the end portions of the reinforcing cords on the side edge portion are positioned on a trailing side in the rotational direction of the building drum, the belt edge tape is adhered to the end portions of the reinforcing cords along with the rotation and hence, the belt edge tape is adhered by pressing using the press rollers on the leading side in the rotational direction of the building drum. Accordingly, even if the acute-angled distal ends of the fine-strip-shaped belt member pieces present on the side edge portion of the belt are warped state, there is no possibility that the press rollers are caught by the acute-angled distal ends and hence, the belt edge tape can be smoothly and surely adhered by pressing using the rollers whereby the above-mentioned method can be favorably carried out.

In the apparatus of adhering belt edge tapes, the supply device may preferably be an extruder which extrudes the belt edge tape having a predetermined cross-sectional shape toward the building drum, and the pair of upper and lower press rollers may preferably be mounted on a head portion of the extruder. Due to such constitution, the belt edge tape made of an unvulcanized rubber material can be smoothly adhered to the side edge portion of the belt while extruding the belt edge tape as described above.

In the apparatus of adhering belt edge tapes, the building drum is controlled to be rotated in the direction that end portions of the cords at the side edge portion of the belt which constitutes a tape adhering side of the belt adhered to the outer peripheral surface of the building drum are positioned on a trailing side in the rotational direction of the building drum. Due to such constitution, on the above-mentioned both respective side edge portions of the belt, it is possible to adhere the belt edge tape to by rotating the building drum such that the end portions of the reinforcing cords on the side edge portion which constitutes a tape adhering side are positioned on a trailing side in the rotational direction of the building drum.

Further, in the apparatus of adhering belt edge tapes, the building drum is capable of moving relative to the supply device in the drum widthwise direction to allow the supply device to be positioned to face one side or another side of the both side edge portions of the belt adhered to the outer peripheral surface of the building drum in an opposed manner thus adhering the belt edge tape to the belt. Due to such constitution, the adhesion of the belt edge tape at both side edge portions of the belt can be performed without any problems.

In the apparatus of adhering belt edge tapes, the pair of upper and lower press rollers may preferably be supported on the head portion of the supply device in a state that the press rollers are tiltable in the pressing direction and the press rollers may be configured to alternately perform a pressing operation using a press drive means. Due to such constitution, the above-mentioned method can be favorably carried out.

Advantage of the Invention

According to the method and the apparatus of adhering a belt edge tape of the present invention, the belt edge tape interposed between the plurality of belt layers can be adhered to both respective side edge portions of the belt adhered to the building drum such that the building drum is rotated in the directions opposite to each other at both side edge portions in the direction that the end portions of the reinforcing cords at the side edge portion are positioned on a trailing side in the rotational direction of the building drum, and the belt edge tape is adhered by pressing using the press rollers on the leading side in the rotational direction of the building drum. Accordingly, on the side edge portion of the belt, the ends of the reinforcing cords or the acute-angled distal ends of the fine-strip-shaped belt member pieces which constitute the belt member are directed toward the trailing side in the rotational direction of the building drum and hence, the press rollers do not rub against the ends of the reinforcing cords or the acute-angled distal ends whereby the favorable pressing state can be ensured without making the press rollers caught by the ends of the reinforcing cords or the acute-angled distal ends thus bringing about the favorable adhesion of the belt edge tape.

BEST MODE FOR CARRYING OUT THE INVENTION

Next, a mode for carrying out the present invention is explained based on an embodiment shown in drawings.

FIG. 1 is a schematic plan view of a portion of a step of adhering a belt edge tape in a tire building step, FIG. 2 is an enlarged plan view showing the positional relationship between a building drum and an extruder in the tire building step, and FIG. 3 is an enlarged side view of the building drum and the extruder. FIG. 4 is a partial side view of an adhering state of the belt edge tape at one side edge portion of a belt, FIG. 5 is a partial perspective view of an adhering state of the belt edge tape at one side edge portion of the belt, FIG. 6 is a partial side view of an adhering state of the belt edge tape at another side edge portion of the belt, and FIG. 7 is an explanatory plan view when the belt edge tape is adhered to the side edge portion of the belt.

In the drawings, a symbol D indicates an expansible/shrinkable building drum for building a cylindrical-shaped belt band formed of a belt layer 7 which is constituted of a plurality of belts 7a, 7b. The building drum D is supported on a support base E for moving the building drum D such that the building drum D is rotatably driven. The building drum D is conveyed from a position P1 for adhering and building a belt 7a which constitutes a lower layer (a first layer) out of the plurality of belts 7a and 7b to a position P2 for adhering the belt edge tape 1. The building drum D is configured to move and stop at a position where one side edge portion of the lower-layer belt 7a on an outer peripheral surface of the building drum D faces an extruder described later in an opposed manner and at a position where another side edge portion of the lower-layer belt 7a on the outer peripheral surface of the building drum D faces the extruder in an opposed manner. Besides the above-mentioned constitution, the extruder may be configured to be relatively movable in the drum width direction.

In the drawings, symbol 10 indicates the extruder which constitutes a supply device for supplying the belt edge tape to be adhered to both side edge portions of the lower-layer belt 7a adhered to the outer peripheral surface of the building drum D at the adhering position P2, that is, a belt edge tape 1 made of an unvulcanized rubber material. The supply device may be formed of a device other than the extruder 10. For example, the supply device may be formed of a device which winds a belt edge tape extruded in a tape shape having a predetermined width and a predetermined thickness around a reel or the like in other step and unwinds and pulls out the belt edge tape. However, in this embodiment, the explanation is made with respect to a case in which the extruder 10 arranged to face the building drum. D in an opposed manner extrudes the belt edge tape 1 toward an outer peripheral surface of the building drum D and adheres by pressing the belt edge tape 1 to the outer peripheral surface of the building drum D.

In the extruder 10 shown in the drawing, a body portion 11 is mounted on a moving means 20 so that the extruder 10 is movable in the direction toward or away from the building drum D which is placed at the adhering position P2. In adhering the belt edge tape 1 to the building drum D, the extruder 10 is configured to approach and reach a position where a predetermined distance suitable for adhesion is defined between the extruder 10 and the outer peripheral surface of the building drum D. Further, the approaching position can be adjusted corresponding to the diameter of the building drum D.

The extruder 10 includes a screw shaft (not shown in the drawings) for extruding the belt edge tape 1 in the inside of the body portion 11 thereof, and the extruder 10 also mounts a gear pump (not shown in the drawings) and a die 13 for forming the belt edge tape 1 having a cross-sectional shape of predetermined width and thickness thereon. When the belt edge tape 1 also functions as an inter-belt pad, a die 13 which can extrude the belt edge tape 1 of a width and a thickness corresponding to the inter-belt pad is used. An extruding operation by the extruder 10 is controlled by a controller (not shown in the drawings) such that the belt edge tape 1 is extruded at a speed corresponding to the rotation of the building drum D. Symbol 14 indicates a drive motor of the gear pump.

A pair of upper and lower press rollers 15a, 15b is mounted on upper and lower portions of the head portion 12. These press rollers 15a, 15b are provided for pressing the belt edge tape 1 made of the unvulcanized rubber material and extruded from the die 13 to the outer peripheral surface of the building drum D on a leading side in the rotational direction of the building drum corresponding to the rotational direction of the building drum D.

The upper and lower press rollers is tiltably supported on the head portion 12 in the pressing operation direction by way of arm members 16a, 16b and, at the same time, are configured to perform the pressing operation alternately or arbitrarily by properly operating pressing drive means 17a, 17b. Particularly, corresponding to the rotation of the building drum D, the extruder 10 is operated so as to extrude the belt edge tape 1 and, at the same time, the upper and lower press rollers 15a, 15b are operated such that the press roller which is positioned on a leading side in the rotational direction of the building drum D performs the pressing operation corresponding to the rotational direction of the building drum D.

That is, when the building drum D is rotated in the upward direction on a side where the building drum D faces the extruder 10 in an opposed manner, as shown in FIG. 4 and FIG. 5, the upper and lower press rollers 15a, 15b are set such that the lower press roller 15b assumes a non-pressing state and the upper press roller 15a performs the pressing operation. On the other hand, when the building drum D is rotated in the downward direction on the side where the building drum D faces the extruder 10 in an opposed manner, as shown in FIG. 6, the upper and lower press rollers 15a, 15b are set such that the upper press roller 15a assumes a non-pressing state and the lower press roller 15b perform the pressing operation.

The pair of press rollers 15a, 15b may be configured to perform the pressing operation alternately by operating one pressing drive means or may be configured to individually perform the pressing operation by operating separate pressing drive means.

Further, the rotational direction of the building drum D is controlled such that corresponding to the inclination direction of the reinforcing cords C in the lower-layer belt 7a adhered to the outer peripheral surface of the drum, the building drum D is rotated in the direction that end portions of the reinforcing cords at the side edge portion of the belt which constitutes a tape adhering side are positioned on a trailing side in the rotational direction of the building drum D.

That is, the building drum D is set and controlled as shown in FIG. 7. That is, when a left side edge portion of the belt 7a on the outer peripheral surface of the building drum D is a tape adhering side and the cords is inclined in the right upward inclination direction, the building drum D is rotated in the upward direction (in the direction indicated by a solid-line arrow). On the other hand, when a right-side side edge portion of the belt 7a on the outer peripheral surface of the building drum D is a tape adhering side and the cords is inclined in the left downward inclination direction, the building drum D is rotated in the downward direction (in the direction indicated by a dotted-line arrow). Then, corresponding to the rotational direction of the building drum D, the pressing operations of the press rollers 15a, 15b are controlled in the above-mentioned manner.

In adhering the belt edge tape 1 made of the unvulcanized rubber material to the side edge portion of the lower-layer belt 7a on the building drum D using the above-mentioned apparatus of adhering the belt edge tape 1, in a state that the one side edge portion is positioned to face the extruder 10 in an opposed manner, the head portion 12 of the extruder 10 is made to approach and reach a position where a predetermined distance is held between the head portion 12 of the extruder 10 and the belt 7a on the building drum D. In this state, the building drum D is rotated in the direction that end portions of the reinforcing cords on the side edge portion of the belt are positioned on a trailing side in the rotational direction of the building drum D (in the direction indicated by the solid-line arrow in FIG. 7), and the belt edge tape 1 having the predetermined cross-sectional shape and made of the rubber material is extruded by operating the extruder 10 corresponding to the rotation of the building drum D. Simultaneous with such an extruding operation, the upper press roller 15a performs the pressing operation so as to adhere the belt edge tape 1 to one side edge portion (left side edge portion shown in FIG. 7) of the belt 7a.

When the adhesion of the one belt edge tape 1 amounting to one turn of the building drum D is completed, the operation of the extruder 10 is stopped to stop extrusion and the rotation of the building drum D is continued in a state that the belt edge tape 1 is pressed by the press roller 15a and hence, the belt edge tape is cut by tearing. Thereafter, a pressing force applied to the belt edge tape 1 by the press roller 15a is released.

Then, the building drum is moved in the width direction, and another side edge portion is positioned to face the extruder 10 in an opposed manner. In such a state, the building drum D is rotated in the direction opposite to the rotational direction of the building drum D on the above-mentioned one side, that is, in the downward direction (the direction indicated by the dotted arrow in FIG. 7) such that the end portions of the inclined reinforcing cords of on the side edge portion are positioned on a trailing side in the rotational direction of the building drum D. Corresponding to this rotation, the extruder 10 is operated so as to extrude the belt edge tape 1 made of the rubber material and, simultaneously, the lower press roller 15b is operated to perform a pressing operation thus adhering by pressing the belt edge tape 1 to another side edge portion of the belt 7a. Upon completion of adhesion of the belt edge tape 1 amounting to at least one turn of the building drum D, the belt edge tape 1 is cut in the same manner as mentioned previously and, thereafter, the pressing of the press roller 15b is released, and the whole extruder 10 is retracted to a standby position.

After completion of the adhesion of the belt edge tape 1, the above-mentioned building drum D is moved to an adhesion building position (not shown in the drawing) of the belt 7b which constitutes the upper layer (second layer). With the adhesion building of the belt 7b, the belt edge tape 1 is interposed between the side edge portions of the belts 7a, 7b which constitute the lower and upper layers respectively.

With respect to inter-belt pads, depending on necessity, the inter-belt pads may be interposed between belts by adhesion separate from the adhesion of the belt edge tape 1, or the belt edge tape 1 may be configured to also function as the inter-belt pads, or the adhesion of the inter-belt pads may be omitted.

As described above, in adhering the belt edge tape 1 to both respective side edge portions of the belt 7a which constitutes the lower belt, the building drum D is rotated in the direction that the end portions of the reinforcing cords at the belt side edge portion of the belt which constitutes a tape adhering side are positioned on a trailing side in the rotational direction of the building drum D, and the belt edge tape 1 is adhered by pressing to the belt 7a by the press roller 15a or 15b on a leading side in the rotational direction and hence, on the belt edge portion, the ends of the reinforcing cords and the acute-angled distal ends b1 of the fine-strip-shaped belt member pieces b which constitutes the belt member are directed toward the trailing side in the rotational direction of the building drum D. Accordingly, there is no possibility that the press roller 15a, 15b rubs against the inclined ends of the reinforcing cords or the acute-angled distal ends of the inclined strip-shaped belt member pieces and hence, even if the acute-angled distal ends b1 of the belt member pieces are projected in a slightly warped manner, there is no possibility that the pressing rollers 15a, 15b are caught by the ends of the reinforcing cords or the acute-angled distal ends b1 or the belt edge tape 1 is broken and hence, the belt edge tape 1 can be approximately uniformly and surely pressed to the whole circumference of the tire whereby the belt edge tape 1 can be smoothly and accurately adhered to the belt 7a.

Particularly, with the use of the apparatus which mounts the pair of upper and lower press rollers 15a, 15b on the head portion 12 of the above-mentioned extruder 10 and controls the pressing corresponding to the rotational direction of the building drum D and hence, the above-mentioned adhesion of the belt edge tape 1 can be easily and automatically performed.

Here, even when the belt layer has the three-layered structure having a buffer belt as the innermost layer (first layer) besides the above-mentioned two-layered belt as in the case of a heavy-duty tire such as a track or a bus, the present invention is applicable, in the same manner as describe above, by interposing the belt edge tape between a belt which constitutes the intermediate layer (second layer) having the largest width and a belt which constitutes the third layer arranged above the intermediate layer. Here, the inter-belt pads are interposed between the belt which constitutes the innermost layer and the intermediate layer.

INDUSTRIAL APPLICABILITY

The method and apparatus of adhering the belt edge tape of the present invention are, in some parts of the building step of the tire having a plurality of layers, preferably applicable to the adhesion of the belt edge tape made of a rubber material which is interposed between the belt layers for protecting the belt edge or preventing the separation defect. Further, the method and apparatus of adhering the belt edge tape of the present invention are also applicable to the adhesion of the belt edge tape which also functions as the inter-belt pads.

Figure 1:
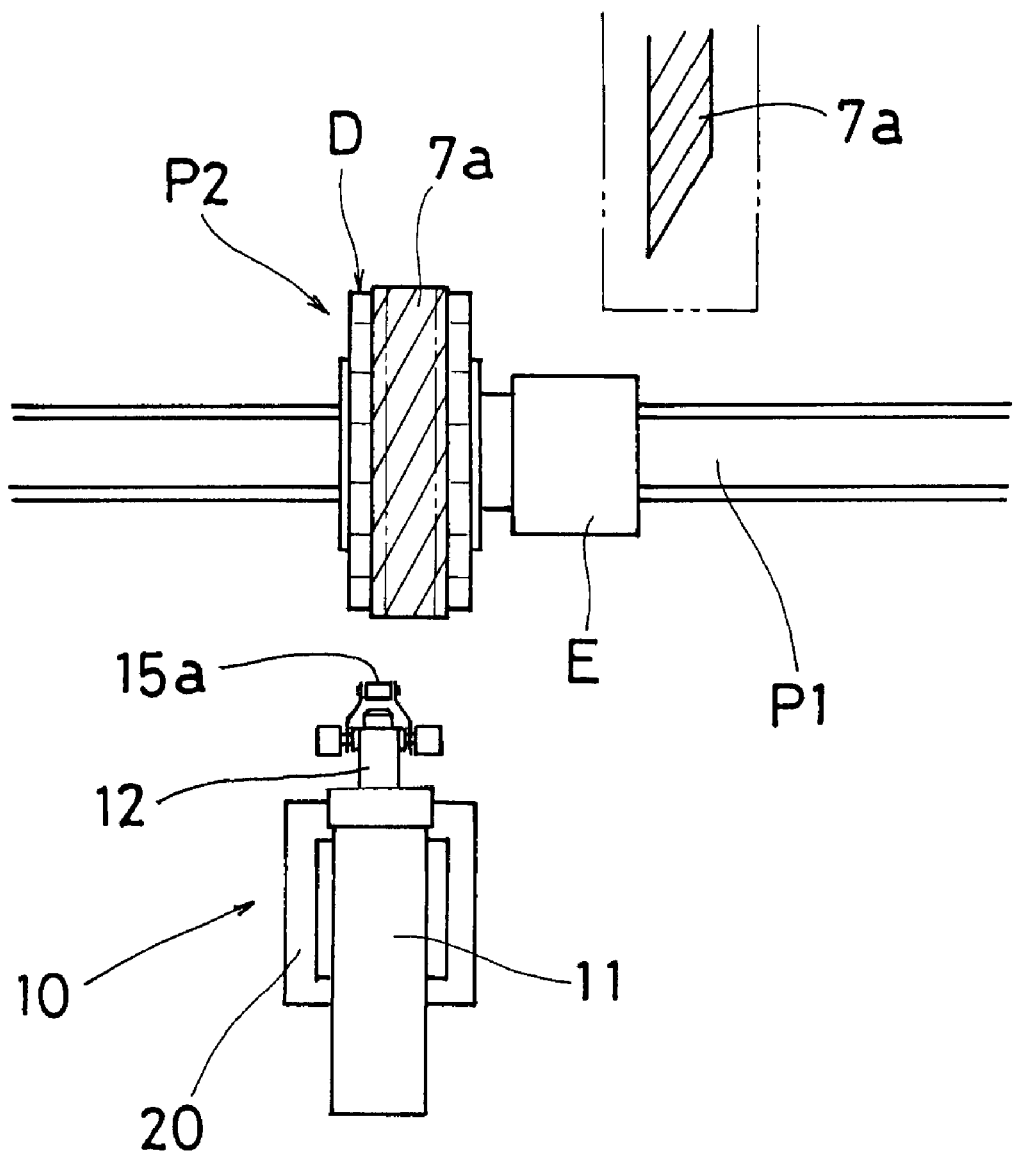
FIG. 1 A schematic plan view of a portion of a step of adhering a belt edge tape in a tire building step illustrating one embodiment of the invention.
Figure 2:
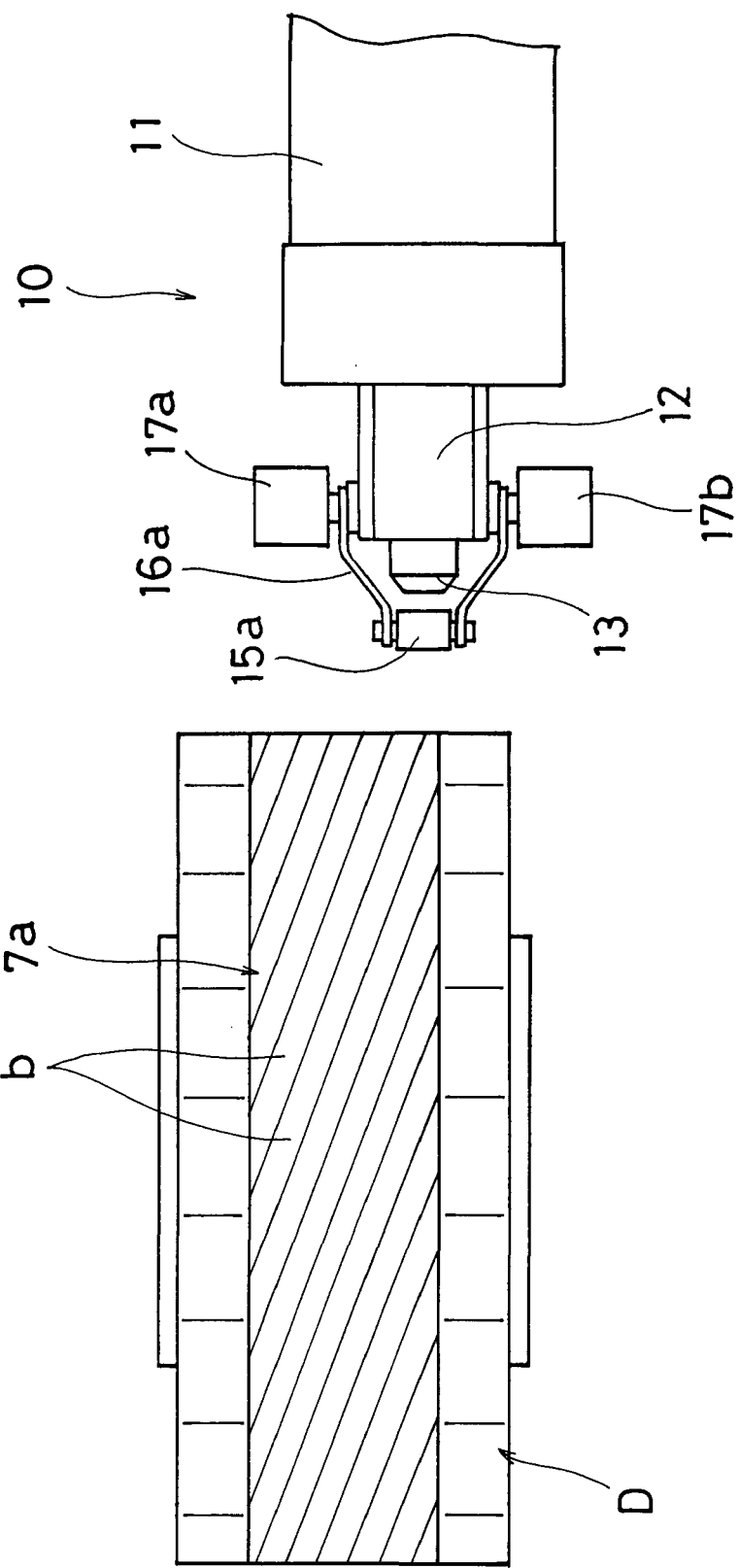
FIG. 2 An enlarged plan view showing the positional relationship between a building drum and an extruder in the tire building step.
Figure 3:
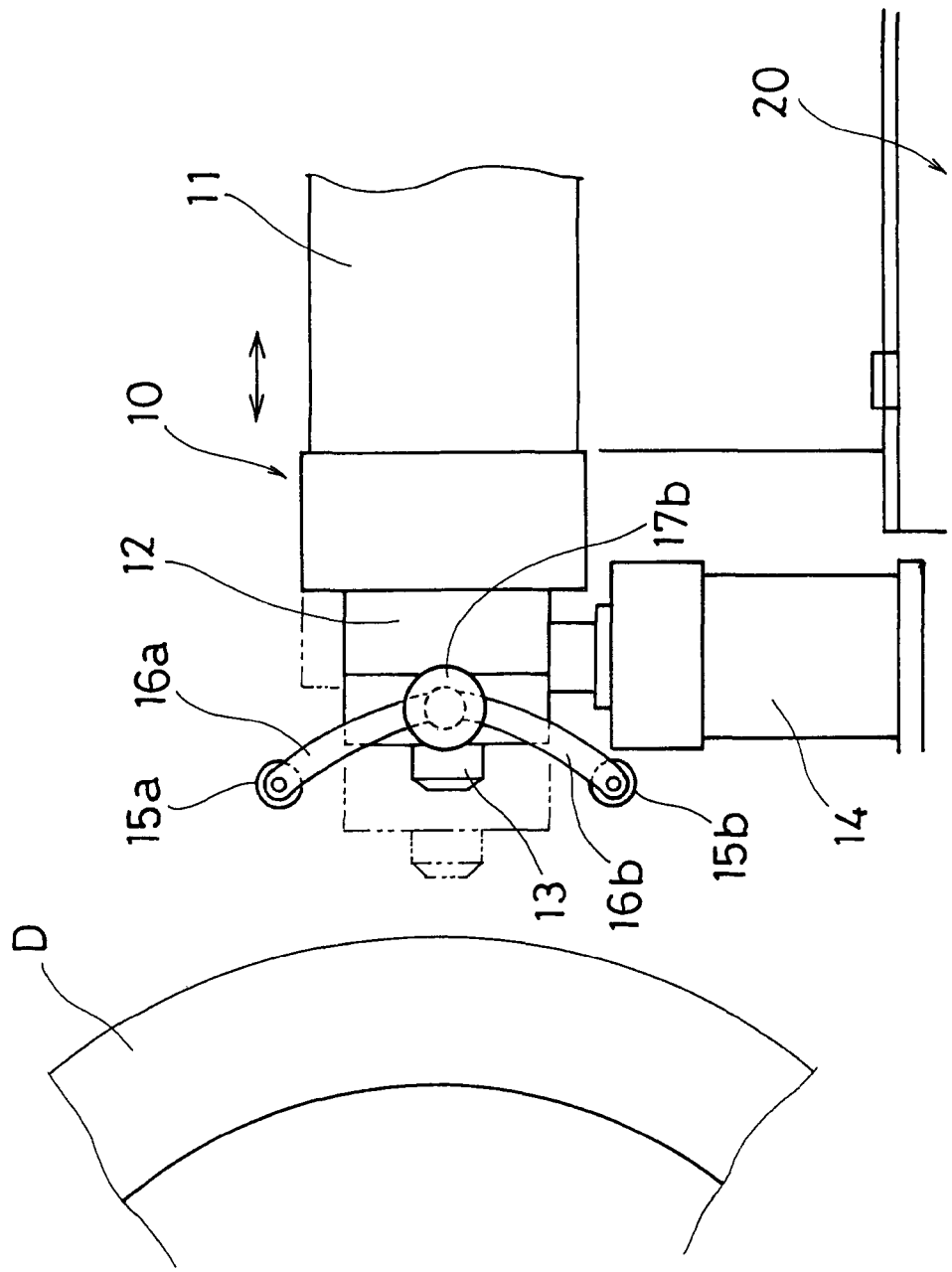
FIG. 3 An enlarged side view showing the head portion of the extruder.
Figure 4:
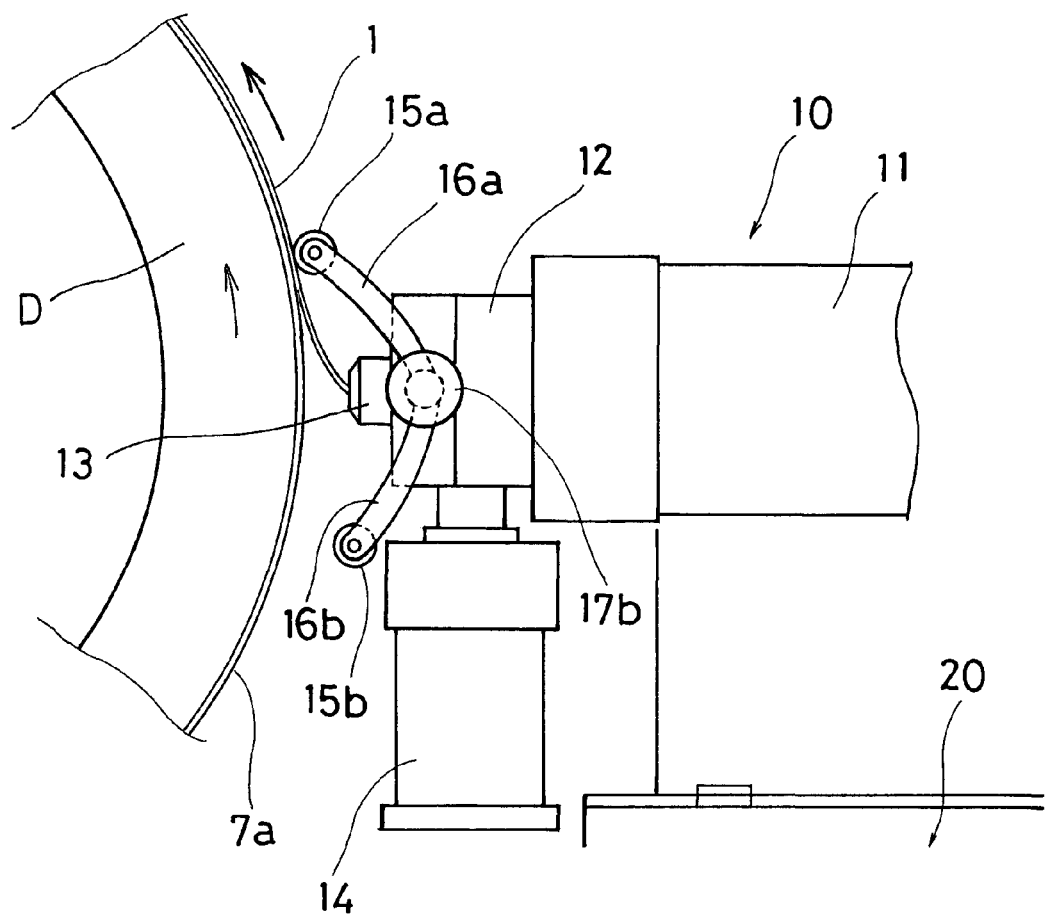
FIG. 4 A partial side view of an adhering state of the belt edge tape at one side edge portion of a belt layer.
Figure 5:
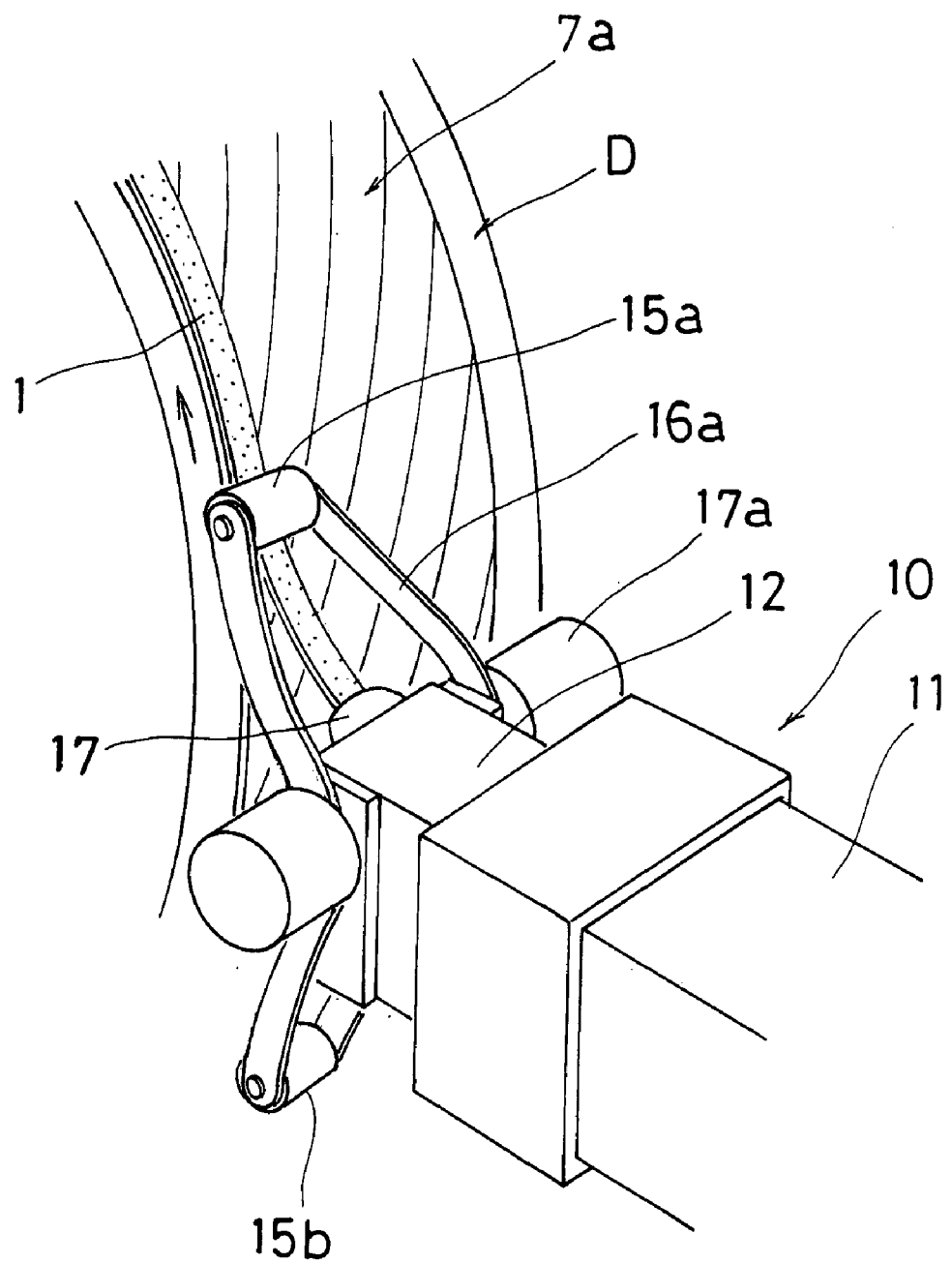
FIG. 5 A partial perspective view of an adhering state of the belt edge tape at one side edge portion of a belt layer.
Figure 6:
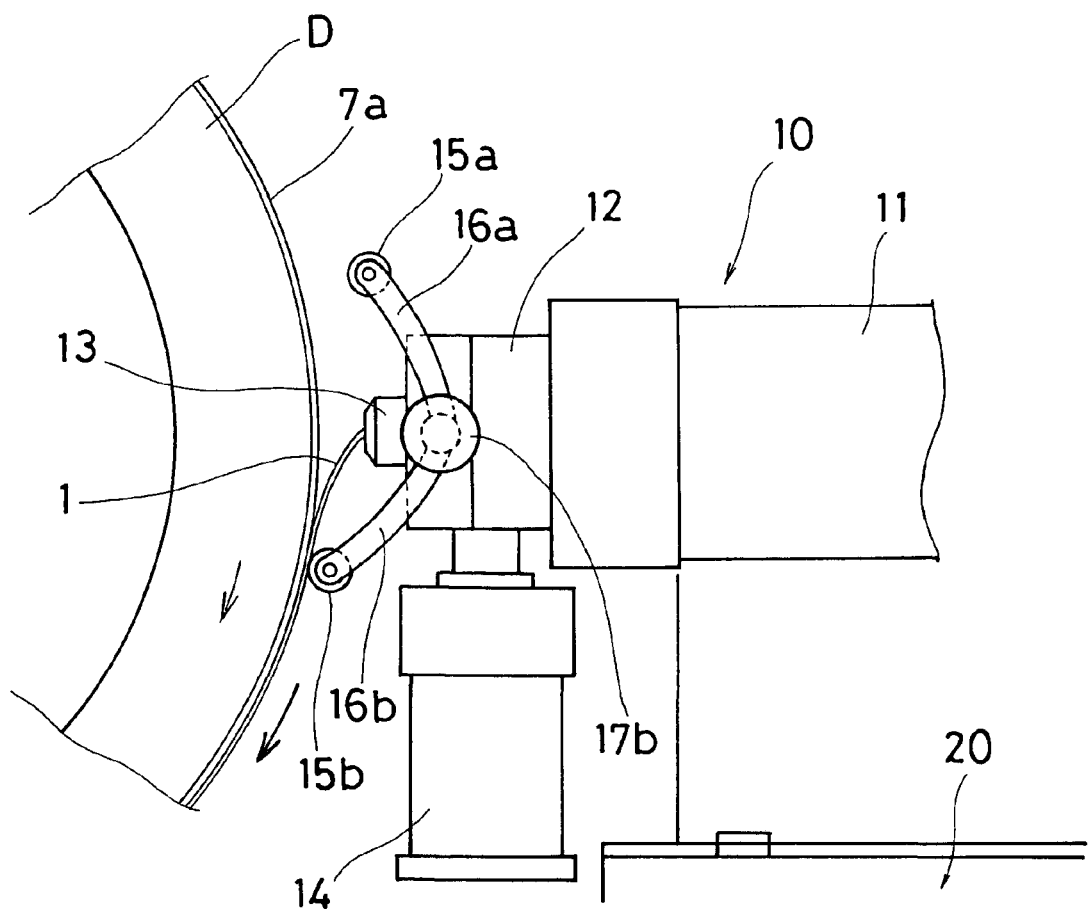
FIG. 6 A partial side view of an adhering state of the belt edge tape at another side edge portion of the belt layer.
Figure 7:
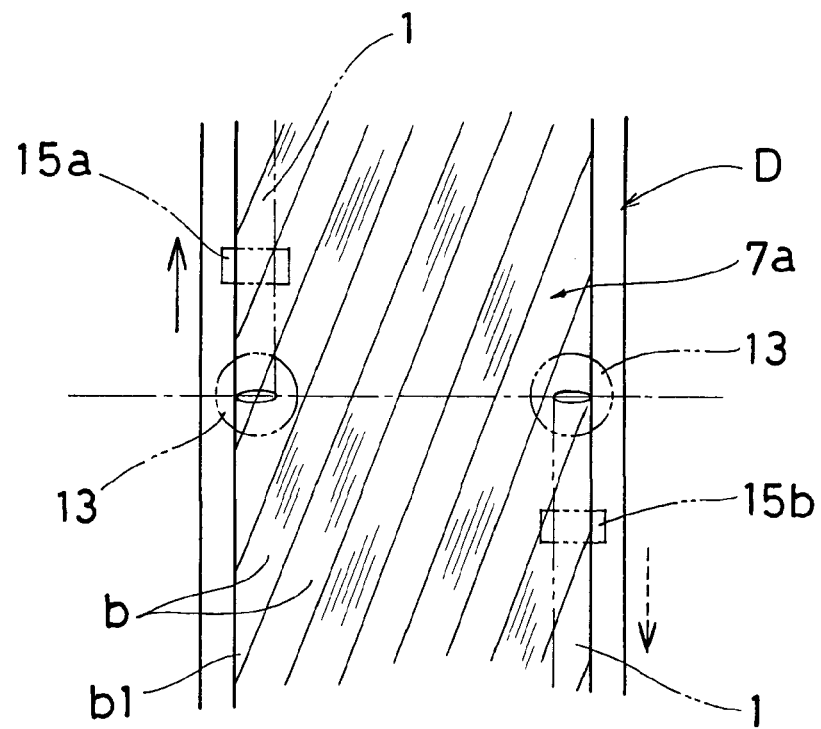
FIG. 7 An explanatory plan view when the belt edge tape is adhered to the side edge portion of the belt layer.
Figure 8:
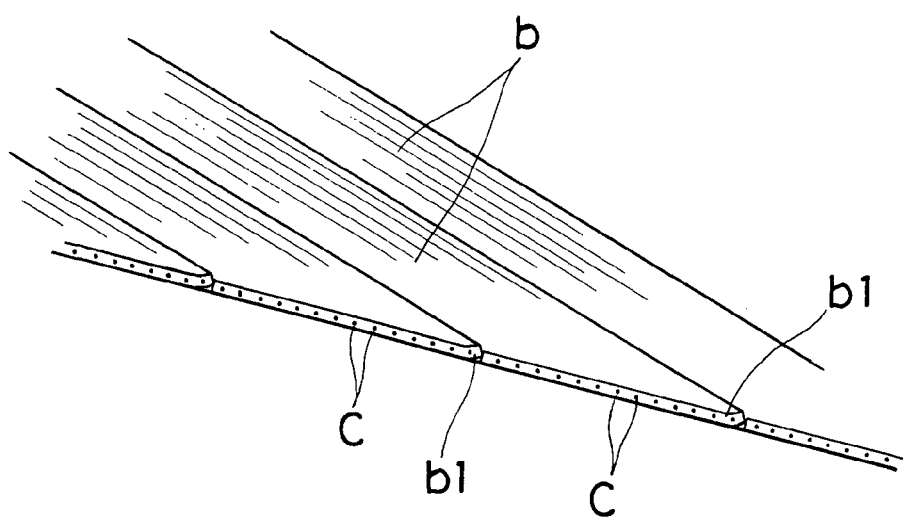
FIG. 8 An enlarged explanatory view of one side edge portion of the belt layer.
Figure 9:
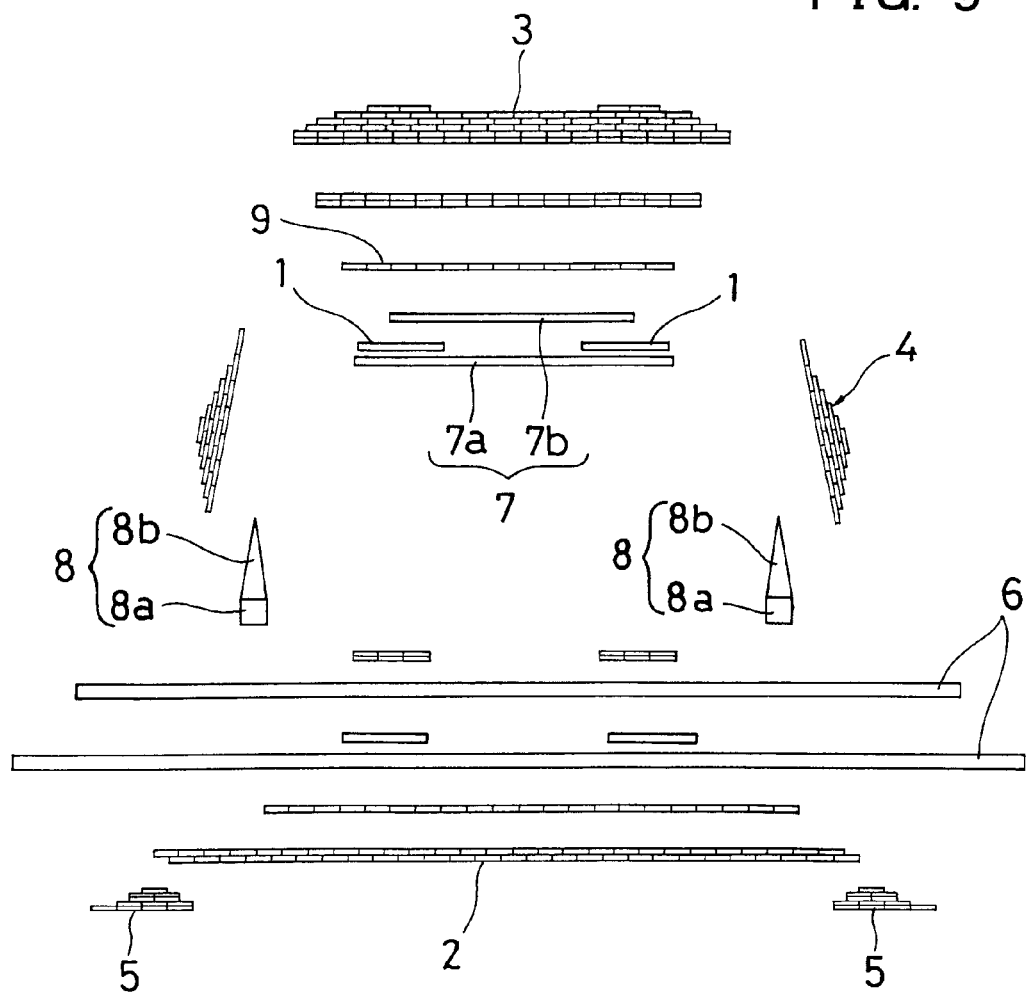
FIG. 9 A schematic explanatory view showing one example of respective constitutional parts of a tire in an exploded manner.
Figure 10:
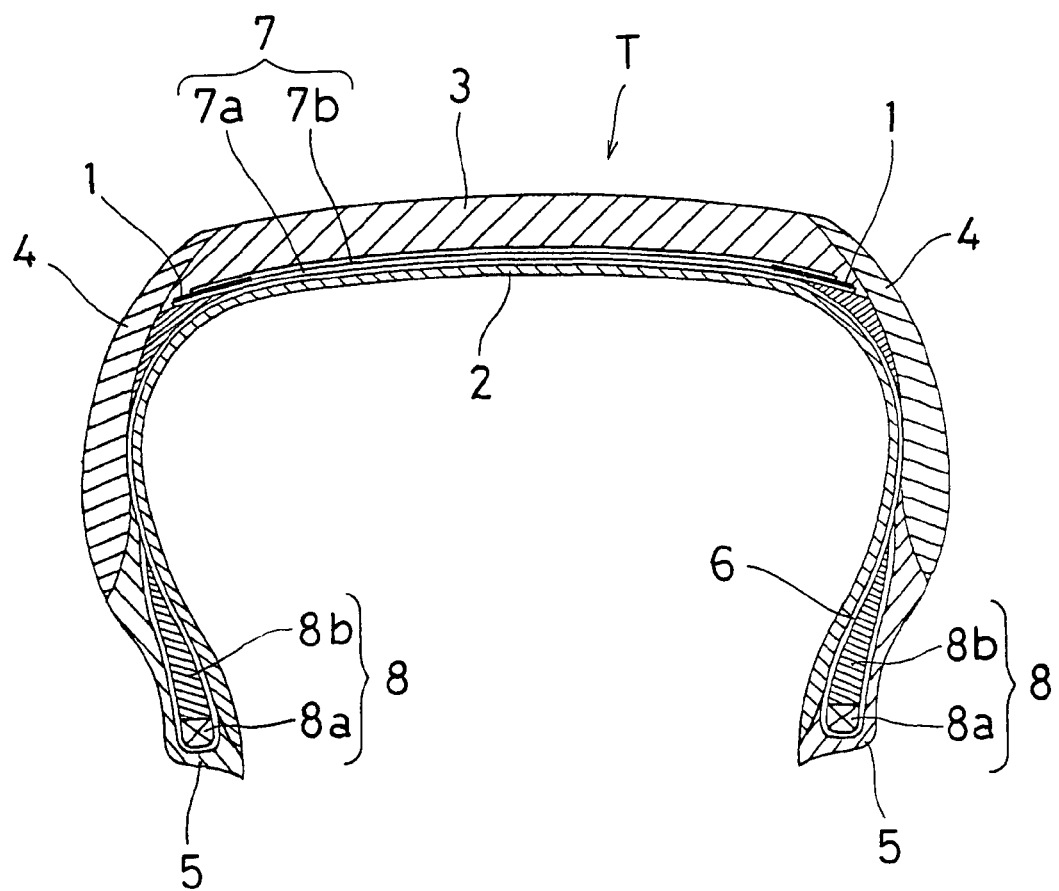
FIG. 10 A cross-sectional explanatory view of the tire structure.

DESCRIPTION OF THE REFERENCE SYMBOLS AND SIGNS b: fine-strip-shaped belt member pieces, b1: distal end having acute angle, C: reinforcing cord, D: building drum, E: support base for moving building drum, T: tire, 1: belt edge tape, 2: inner liner, 3: tread, 4: side wall, 5: rim strip, 6: carcass layer, 7: belt layer, 7a: lower-layer belt, 7b: upper-layer belt, 8: bead body, 8a: bead core, 8b: bead filler, 9: reinforcing layer, 10: extruder, 11: body, 12: headportion, 13: die, 14: drive motor, 15a, 15b: upper and lower press rollers, 16a, 16b: arm members, 17a, 17b: pressing drive means, 20: moving means

The invention claimed is:

1. An apparatus of adhering belt edge tapes made of a rubber material which are interposed between a plurality of layers of belts containing inclined reinforcing cords therein to both side edge portions of a belt adhered to an outer peripheral surface of a building drum during one step of tire building, wherein the apparatus includes a supply device which faces the building drum capable of being rotated in the forward and reverse directions in an opposed manner and supplies the belt edge tape toward the outer peripheral surface of the building drum along with the rotation of the building drum, a pair of upper and lower press rollers capable of performing a pressing operation respectively is mounted on upper and lower portion of the supply device such that the press rollers are respectively allowed to press the belt edge tape to the outer peripheral surface of the building drum, and the upper and lower press rollers are arranged such that the press rollers press the belt edge tape only on a leading side in the rotational direction of the building drum along with the forward or reverse rotation of the building drum, the upper and lower press rollers being symmetrically mounted with respect to the supply device on said upper and lower portion, and wherein the building drum is controlled to be rotated in the direction that end portions of the cords on the one and other side edge portions of the belt which each constitute a tape adhering side of the belt adhered to the outer peripheral surface of the building drum are positioned on a trailing side in the rotational direction of the building drum.

2. An apparatus of adhering belt edge tapes according to claim 1, wherein the supply device is an extruder which extrudes the belt edge tape having a predetermined cross-sectional shape toward the building drum, and the pair of upper and lower press rollers is mounted on a head portion of the extruder.

3. An apparatus of adhering belt edge tapes made of a rubber material which are interposed between a plurality of layers of belts containing inclined reinforcing cords therein to both side edge portions of a belt adhered to an outer peripheral surface of a building drum during one step of tire building, wherein the apparatus includes a supply device which faces the building drum capable of being rotated in the forward and reverse directions in an opposed manner and supplies the belt edge tape toward the outer peripheral surface of the building drum along with the rotation of the building drum, a pair of upper and lower press rollers capable of performing a pressing operation respectively is mounted on upper and lower portion of the supply device such that the press rollers are respectively allowed to press the belt edge tape to the outer peripheral surface of the building drum, and the upper and lower press rollers are arranged such that the press rollers press the belt edge tape on a leading side in the rotational direction of the building drum along with the forward or reverse rotation of the building drum, wherein the building drum is controlled to be rotated in the direction that end portions of the cords on the side edge portion of the belt which constitutes a tape adhering side of the belt adhered to the outer peripheral surface of the building drum are positioned on a trailing side in the rotational direction of the building drum, wherein the building drum is capable of moving relative to the supply device in the drum width direction to allow the supply device to be positioned to face one side or another side of the both side edge portions of the belt adhered to the outer peripheral surface of the building drum in an opposed manner thus adhering the belt edge tape to the belt.

4. An apparatus of adhering belt edge tapes according to claim 2, wherein the pair of upper and lower press rollers is supported on the head portion of the supply device in a state that the press rollers are tiltable in the pressing direction and the press rollers are configured to alternately perform a pressing operation using a press drive means.

5. An apparatus of adhering belt edge tapes according to claim 2, wherein the building drum is controlled to be rotated in the direction that end portions of the cords on the side edge portion of the belt which constitutes a tape adhering side of the belt adhered to the outer peripheral surface of the building drum are positioned on a trailing side in the rotational direction of the building drum.

* * * * *